United States Patent

Deville et al.

[11] Patent Number: 5,956,654
[45] Date of Patent: *Sep. 21, 1999

[54] DATA EXCHANGE SYSTEM WITH A PLURALITY OF DATA CARRIERS

[75] Inventors: Yannick Deville, Villecresnes; Laurence Andry, Yerres, both of France

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/709,499

[22] Filed: Sep. 6, 1996

[30] Foreign Application Priority Data

Sep. 6, 1995 [FR] France ................. 95/10444

[51] Int. Cl.$^6$ ................................................. H04B 1/38
[52] U.S. Cl. ........................................... 455/561; 455/517
[58] Field of Search .............................. 455/41, 517, 561; 342/42, 44, 51; 340/825.34, 825.31

[56] References Cited

U.S. PATENT DOCUMENTS

| | | | |
|---|---|---|---|
| 5,124,699 | 6/1992 | Tervoert et al. | 342/44 |
| 5,594,447 | 1/1997 | Usui et al. | 343/42 |
| 5,627,544 | 5/1997 | Snodgrass et al. | 342/42 |

FOREIGN PATENT DOCUMENTS 8508695  10/1985  United Kingdom.

*Primary Examiner*—Reinhard J. Eisenzopf
*Assistant Examiner*—Marsha D. Banks-Harold
*Attorney, Agent, or Firm*—Laurie E. Gathman

[57] ABSTRACT

The system includes a base station (1) which communicates with a plurality of data carriers ($2_1$, $2_2$) via wireless links. In order to enable the station (1) to identify several data carriers simultaneously, the system includes a device (15) for the separation of sources and also several demodulation units ($12_1$, $12_2$).

Depending on the type of modulation, the type of link used, and the arrangement of the source separation device (15) with respect to the demodulation units, the signals received by the source separation device can be convolutional mixtures or instantaneous linear mixtures of the signals transmitted by the data carriers. In order to process the different types of signal received, the source separation device may have a recursive structure, a direct structure or a mixed structure. Adaptation means (105) calculate filtering coefficients which are adapted to enable the source separation device (15) to separate the estimated identification signals for each data carrier requesting communication with the base station.

8 Claims, 5 Drawing Sheets

DATA EXCHANGE SYSTEM WITH A PLURALITY OF DATA CARRIERS

FIELD OF THE INVENTION

The invention relates to a data exchange system, including a base station and at least one data carrier which are coupled to one another via wireless links in order to exchange data, the station including transmitter means and receiver means for interrogating at least one data carrier and for receiving, in response thereto, an identification signal transmitted by the interrogated data carrier, respectively, the data carrier including transmitter/receiver means. The invention relates to a base station.

BACKGROUND OF THE INVENTION

Systems of this kind are used, for example for checking persons wishing access to locations, for the identification of vehicles, for the identification of merchandise or, more generally, for identifying any badge or other portable device intended for recognition of its bearer.

Generally speaking, the system comprises a base station which is coupled to the data carrier, for example a badge. The latter includes a memory, possibly a programmable memory, which stores notably an identifier which enables identification of the person, animal or object wearing the badge. During use the badge is interrogated by the base station by application of an interrogation signal. In response thereto the badge supplies a return signal which contains the identifier stored in the badge. The base station demodulates and decodes the return signal and, if the badge is recognized and accepted, the base station validates the recognition and takes the appropriate actions.

However, these systems are often disrupted when two or more badges must be simultaneously recognized. Actually, it may be difficult for a base station to decode signals simultaneously arriving from two badges. Some systems solve this problem by imposing exchange protocols based on sequences of interrogations and responses. However, this complicates the hardware means used and the processing time is also considerably prolonged. The document GB 2 157 132 A describes an identification system which includes an interrogation station capable of operating simultaneously with a plurality of badges to be identified. This system suffers from the described drawbacks. Actually, because of such a protocol the badge must be provided with specific means in order to establish this protocol, so that the structure of the badge is significantly complicated and its manufacturing cost increased. Moreover, error sources occur when the transmission circumstances are such that the signals exchanged are drowned in noise.

SUMMARY OF THE INVENTION

Therefore, it is an object of the invention to propose a data exchange system which enables fast and simultaneous identification of a plurality of data carriers, without complicating the data carrier structure, while avoiding any exchange protocol even though the badges respond simultaneously, the system operation being more reliable even in the presence of significant ambient noise.

This object is achieved by means of a system and by means of a base station in which, in order to establish a plurality of wireless links simultaneously between the base station and several data carriers, the receiver means of the station include a source separation device for processing signal mixtures dependent on mixtures of identification signals transmitted by the data carriers simultaneously requesting connection to the station, the receiver means including several demodulation units which are connected either to the output or to the input of the source separation means, the receiver means delivering estimated identification signals for said data carriers to be simultaneously connected.

Thus, the structure of the badge (or of the data carrier in general) remains unchanged, the processing performed in the station being executed sequentially, one badge after the other, or simultaneously for several badges.

In response to the interrogation signal transmitted by the base station, the badges respond by transmitting a respective return signal modulated by their respective identifier. The signals mixtures from all badges transmitting simultaneously are then separated in the base station by application of a source separation technique. Multiple complex interrogation procedures, followed by confirmation responses, are no longer necessary. Moreover, the system is much more rugged in respect of ambient noise, enabling greater recognition distances between the base station and the badge. Moreover, the system can reduce the power consumption during operation.

The wireless links may be very diverse, for example infrared links, radio-frequency links, ultrasound links. For each specific type of wireless link the system includes specific input/output means for the transmission and reception of the signals exchanged. Thus, the system will involve aerials for radio-frequency links, emitter/receiver transducers for ultrasonic links, or light transmitters and receivers for infrared links.

The source separation device can be arranged either between the demodulation units and the input receiver means which are specific of each type of link, or subsequent to the demodulation units. In the first case the source separation device supplies a modulated estimation signal which is dependent on the identification signal of the data carrier. In the second case the source separation device supplies the estimated identification signal directly.

Different types of mixtures can thus occur in dependence on the type of link, on the position of the source separation device with respect to the demodulation units, and on the type of modulation used (amplitude modulation, frequency modulation, phase modulation). These different situations may thus give rise, generally speaking, to convoluted mixtures and notably to instantaneous linear mixtures.

Thus, when the wireless links are of the inductive type, for example an aerial, and the source separation device is arranged subsequent to the demodulation units, the signal mixtures arriving at the input of the source separation device are instantaneous linear mixtures in the case of amplitude modulation signals.

In order to enable separation of the various types of mixture that may occur, the source separation device may have a direct structure, a recursive structure or a mixed structure which combines a partly direct structure and a partly recursive structure. All of these structures utilize filtering coefficients which are applied to the various signals. The system itself calculates the filtering coefficients required for performing the separation of the signals.

In the case of a recursive structure, for the simultaneous identification of n data carriers the source separation device includes n recursively connected summing devices, each summing device having:
   an input for receiving a signal mixture,
   an output for delivering either the estimated identification signal of one of the data carriers or an estimation signal which is dependent on the identification signal, and n−1 inputs, each of which is connected to a respective output of one of the n−1 other summing devices via n−1 filtering means applying at least one respective filtering coefficient, said source separation device including means for adapting filtering coefficients, enabling the device to supply the estimated identification signals.

In the case of a direct structure, for the simultaneous identification of n data carriers the source separation device comprises n summing devices which are not recursively connected, each summing device having:

n inputs, each of which receives a respective one of the n signal mixtures via n filtering means applying at least one respective filtering coefficient, and an output for delivering either the estimated identification signal of one of the data carriers or an estimation signal which is dependent on the identification signal, said source separation device including means for adapting the filtering coefficients, enabling the device to supply the estimated identification signals.

In the case of a mixed structure, for the simultaneous identification of n data carriers the source separation device comprises n summing devices, each summing device having:

an input for receiving a respective signal mixture, an output for delivering either the estimated identification signal of one of the data carriers or an estimation signal which is dependent on the identification signal, and n−1 inputs which are connected partly to the output of a part of the n−1 other summing devices and partly to one of the other signal mixtures, via n−1 filtering means applying at least one respective filtering coefficient, said source separation device including means for adapting filtering coefficients, enabling the device to supply the estimated identification signals.

These and other aspects of the invention will be apparent from and elucidated with reference to the embodiments described hereinafter.

BRIEF DESCRIPTION OF THE DRAWINGS

The invention will be better understood on the basis of the following Figures which are given by way of non-limitative examples.

DESCRIPTION OF EMBODIMENTS

Figure 3:
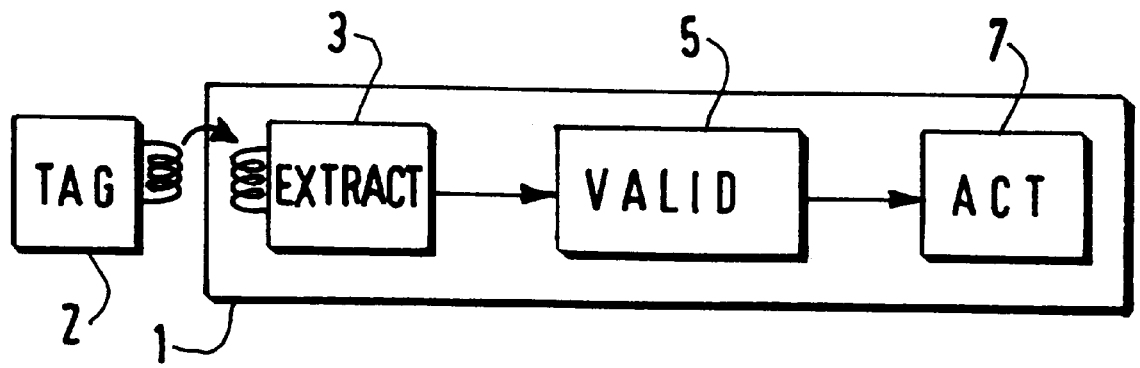
FIG. 3 shows a general diagram of a known data exchange system.

FIG. 3 shows a known data exchange system. It comprises a base station 1 which receives from a data carrier 2, for example a badge TAG, an identification signal which includes an identifier ID. The connection between the badge and the base station is established as a wireless link by means of a carrier modulated by the identification signal. The base station includes a series connection of a module 3 EXTRACT for extracting the badge identifier, a module 5 VALID for validating the identifier, and an actuator module 7 ACT which performs an operation, for example granting access to a restricted-access area.

Figure 1:
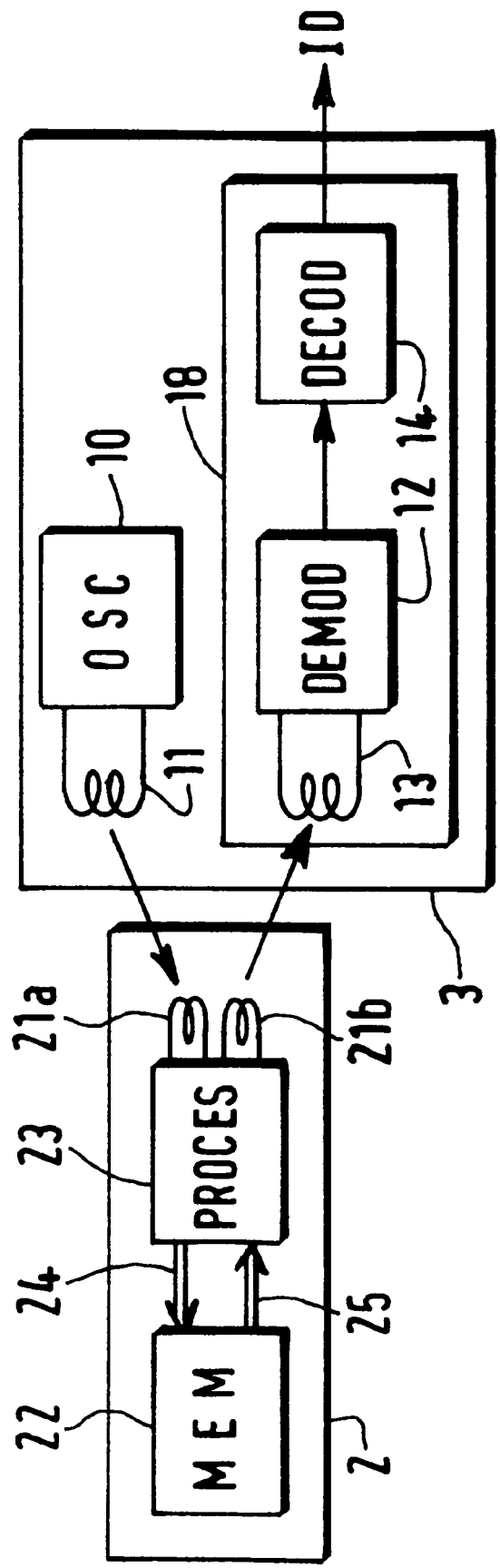
FIG. 1 shows a detailed diagram of a part of a known data exchange system.

FIG. 1 shows a part of a known data exchange system. It includes the extraction module 3 and the badge 2 which must be identified when it is present in the field of operation of the base station. The extraction module includes transmitter means which comprise an oscillator 10 with a transmission aerial 11, for example of an inductive type. The badge 2 includes a receiving aerial 21a and a transmission aerial 21b which are connected to a processor 23 PROCES which is connected to storage means MEM 22 which supply data. This data is, for example, an identifier ID of the badge. The extraction module also comprises receiver means 18 which include a receiving aerial 13 which is connected to a demodulation unit 12 DEMOD which is succeeded by a decoding unit DECOD 14. The modulated signal received by the aerial 13 in the base station is demodulated in the demodulation unit 12 which applies the demodulated signal to the decoding unit 14 which delivers the badge identifier ID.

The base station must identify the identifier ID stored in the badge in such a manner that it grants the person wearing the badge the authorization envisaged or to deny the authorization in the case of non-recognition. It may also concern recognition of an object or an animal triggering the actions envisaged in the relevant case. To this end, the oscillator 10 transmits, via the aerial 11, a signal which reaches, via a wireless link, the receiving aerial 21a of the badge when the latter is present in the field of operation of the base station. The processor 23 extracts, for example a clock signal and various control signals from the signal received, thus enabling the processor to operate and address the memory 22 (connection 24). It subsequently transforms the signal received by modulation by the identifier ID read in the memory in order to supply an identification signal X(t) (connection 25) which serves to modulate a carrier transmitted to the base station 1 by the transmission aerial 21b. The two aerials 21a and 21b may be merged.

However, this mode of operation is feasible exclusively if only a single badge communicates with the base station at a given instant. Actually, when at least two badges simultaneously request identification, the interrogation signal transmitted by the aerial 11 simultaneously interrogates all badges responding at the same time, so that the modulated signals returned by the badges arrive at the aerial 13 in a mixed fashion.

Figure 2:
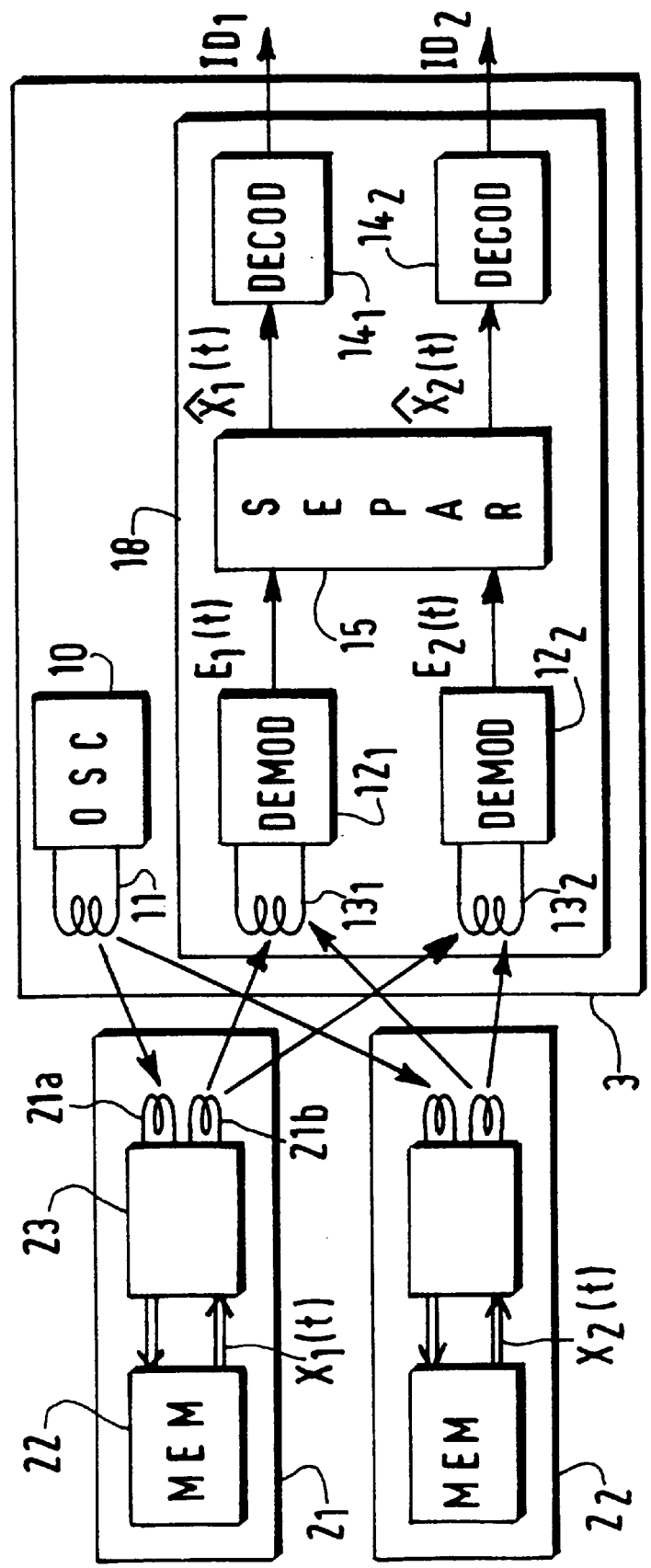
FIG. 2 shows a diagram of a data exchange system according to the invention in which the source separation device is arranged subsequent to the demodulation units.

FIG. 2 shows the system in accordance with the invention in the case, given by way of example, where the source separation device 15 is arranged subsequent to the demodulation units, the case being limited to two badges $2_1$, $2_2$ simultaneously requesting communication with the base station. The extraction means 3 include two receiving aerials $13_1$, $13_2$ which are connected to two demodulation units $12_1$, $12_2$, respectively. Each receiving aerial $13_1$, $13_2$ receives signals from the two badges $2_1$, $2_2$ in the form of mixtures of two modulated signals, each of which contains an identification signal $X_1(t)$ or $X_2(t)$.

The signal mixtures are demodulated in the demodulation means $12_1$ and $12_2$ which supply demodulated signals $E_1(t)$ and $E_2(t)$ which are subjected to the operation of the source separation device SEPAR 15. The latter device supplies estimations $\hat{X}_1(t)$ and $\hat{X}_2(t)$ of the original signals $X_1(t)$ and $X_2(t)$ transmitted by the badges by modulation of a carrier. The estimated signals $\hat{X}_1(t)$ and $\hat{X}_2(t)$ are decoded in the decoding means $14_1$ and $14_2$ in order to supply the identifiers $ID_1$ and $ID_2$ of the two badges.

Depending on whether the mixtures appearing are instantaneous linear mixtures or convolutional mixtures, the filtering performed in the source separation device could, in the general case, be performed by cells performing an adaptive filtering operation and, in special cases, by cells applying a respective single filtering coefficient which is, therefore, called a separation coefficient. A combination of these two types of filtering is also possible, one channel applying adaptive filtering with several coefficients and another channel applying a single separation coefficient.

Let us consider the simplest case where the source separation device comprises cells, each of which applies a separation coefficient. The source separation then performed by the source separation device 15 can be written as:

$$\hat{X}_k(t) = \sum_{i=1}^{n} C_{ki} \cdot E_i(t) \quad (1)$$

for a direct structure, and as $$\hat{X}_k(t) = E_k(t) - \sum_{i=1, i \neq k}^{n} d_{ki} \cdot \hat{X}_i(t) \quad (2)$$

for a recursive structure.

The coefficients $C_{ki}$, $d_{ki}$ are filtering coefficients, referred to as separation coefficients, which are calculated in real time by the source separation device. For example, for the coefficients $d_{ki}$, the adaptation of the coefficients can be realized in conformity with the equation:

$$d_{ki}(t+1) = d_{ki}(t) + \Delta d_{ki}(t), \quad (3)$$

where:

$$\Delta d_{ki}(t) = \alpha \cdot f(\hat{X}_k(t)) \cdot g(\hat{X}_i(t)), \quad (4)$$

where $f(.)$ and $g(.)$ are predetermined functions, for example:

$$f(\hat{X}_k(t)) = [\hat{X}_k(t)]^3 \text{ and } g(\hat{X}_i(t)) = \hat{X}_i(t), \quad (5)$$

and where:

$$\hat{x}(t) = \hat{X}(t) - <\hat{X}(t)>, \quad (6)$$

$<\hat{X}(t)>$ being an estimation of the mathematical value of $X(t)$, and a being a positive fixed or variable adaptation gain.

Analogous equations apply to the adaptation of the coefficients $C_{ki}$.

The example given concerns signals modulated by amplitude modulation. The case involving other modulations, for example frequency or phase modulations, can be treated analogously.

Figure 4:
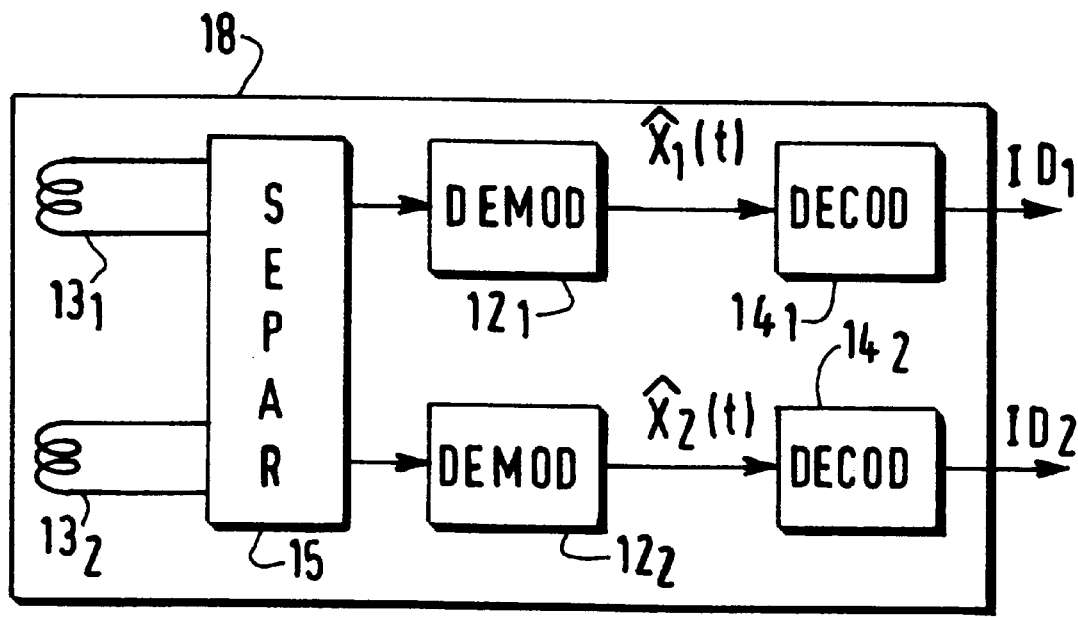
FIG. 4 shows a diagram of a data exchange system according to the invention in which the source separation device is arranged ahead of the demodulation units.

FIG. 4 shows a further embodiment of the receiving means 18. In this case the source separation device 15 is arranged at the output of the aerials, ahead of the demodulation means. The separation thus affects the modulated signal mixtures in dependence on the identification signal mixtures of the data carriers, demodulation taking place only after separation of the signal mixtures.

Figure 5:
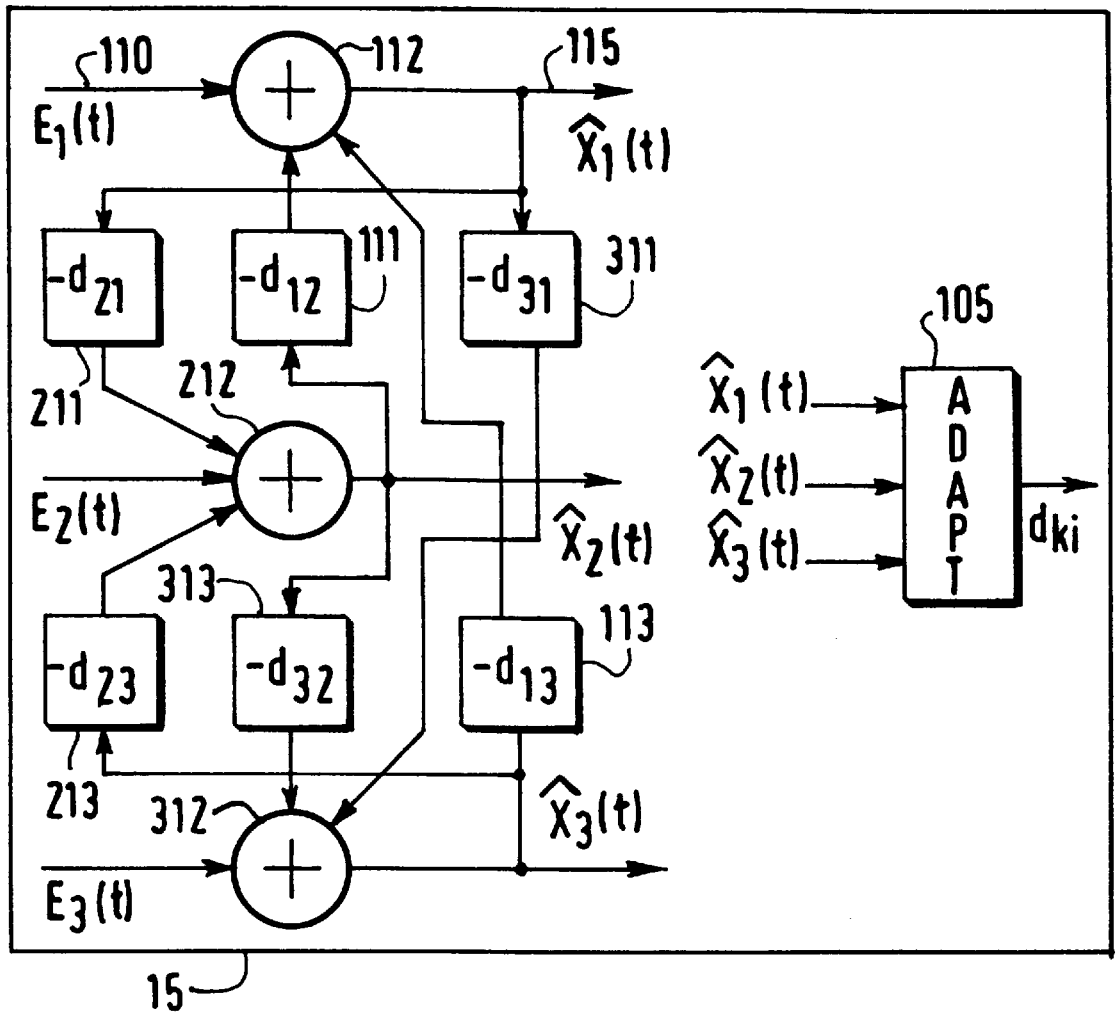
FIG. 5 shows a partial diagram of a source separation device having a recursive structure.

FIG. 5 illustrates, by way of example, the case involving three badges for the embodiment shown in FIG. 2. It shows a source separation device 15 having a recursive structure intended to deliver three estimated identification signals $\hat{X}_1(t)$, $\hat{X}_2(t)$ and $\hat{X}_3(t)$ on the basis of three signal mixtures $E_1(t)$, $E_2(t)$ and $E_3(t)$. The source separation device comprises a plurality of multiplication cells 111, 211, 311, 113, 213, 313, each of which has a single separation coefficient. This structure includes a first summing device 112 with an input 110, connected to the signal $E_1(t)$, and an output 115 which delivers the estimated signal $\hat{X}_1(t)$. A second summing device 212 has an input connected to the signal $E_2(t)$ and an output which delivers the estimated signal $\hat{X}_2(t)$. A third summing device 312 has an input connected to the signal $E_3(t)$ and an output which delivers the estimated signal $\hat{X}_3(t)$. A second input of the first summing device 112 is connected to the output of the second summing device 212, via the multiplication cell 111 which weights the output signal of the second summing device with a coefficient. $-d_{12}$. A third input of the first summing device 112 is connected to the output of the third summing device 312, via the multiplication cell 113 which weights the output signal of the third summing device with a coefficient $-d_{13}$.

Similarly, a second and a third input of the second summing device 212 are connected to the output of the first summing device 112 and of the third summing device 312, respectively, via the multiplication cells 211 and 213, respectively, which weight the output signal of the first and the third summing device with coefficients $-d_{21}$ and $-d_{23}$, respectively.

Similarly, the third summing device 312 is connected to the outputs of the other summing devices 112 and 212 via the multiplication cells 311 and 313, respectively, which weight the output signal of the first and the second summing device with separation coefficients $-d_{31}$ and $-d_{32}$, respectively.

The adaptation of the separation coefficients $d_{ki}$ is performed in the adaptation means ADAPT 105 which receive the estimated signals $\hat{X}_1(t)$, $\hat{X}_2(t)$ and $\hat{X}_3(t)$. To this end, the adaptation means 105 calculate the separation coefficients $d_{ki}$ in conformity with the described equations (3), (4), (5) and (6).

The summing devices and the multiplication cells may form part of a calculator, a microprocessor or a digital signal processing unit suitably programmed to execute the described functions.

Figure 6:
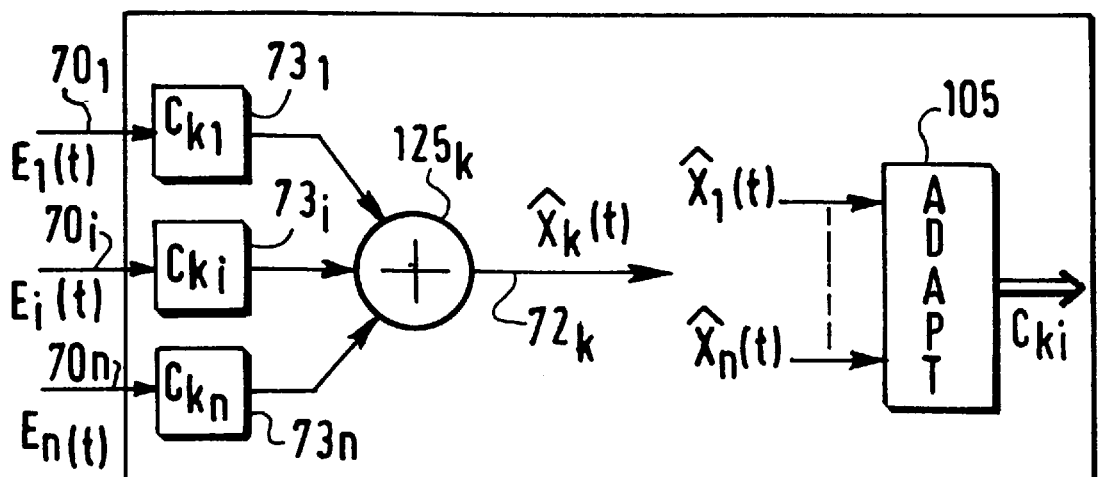
FIG. 6 shows a partial diagram of a source separation device having a direct structure.

FIG. 6 shows a part of a source separation sub-unit $15_k$ which has a direct structure and is intended to be included in a source separation device 15. In the case of n badges transmitting simultaneously, the sub-unit comprises a plurality of multiplication cells $73_1$ to $73_n$, each of which receives a signal mixture $E_1(t)$ to $E_n(t)$. Each of the multiplication cells multiplies the signal by the separation coefficient $C_{k1}$ to $C_{kn}$ applied to the input, where $1 \leq k \leq n$. The outputs of all the multiplication cells $73_1$ to $73_n$ are connected to a summing device $125_k$ for summing all signals and for delivering, via an output $72_k$, the estimated primary signal $\hat{X}_k(t)$. The source separation device 15 contains as many partial sub-units $^{15}k$ as there are estimated signals $\hat{X}_k(t)$ to be determined, i.e. badges to be handled simultaneously. As before, the adaptation of the separation coefficients $C_{ki}$ is performed in the adaptation means ADAPT 105.

Figure 7:
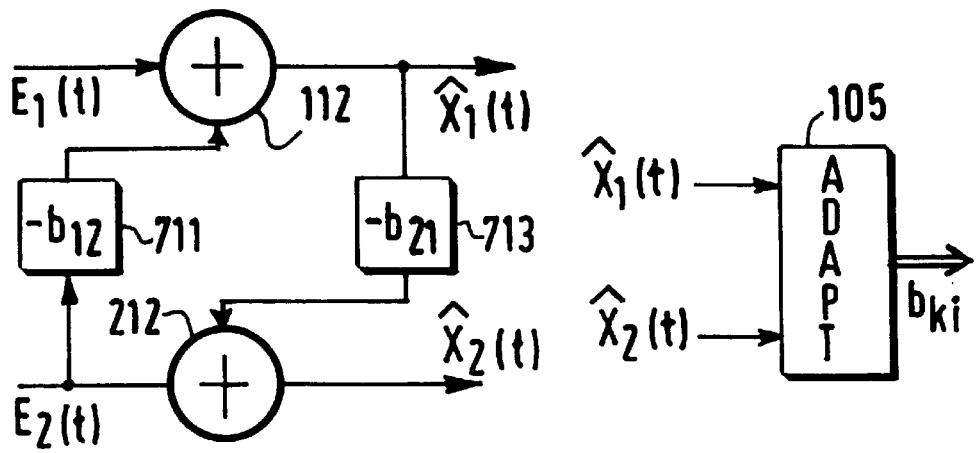
FIG. 7 shows a partial diagram of a source separation device having a mixed structure for separating two mixture signals.

The recursive structure of FIG. 5 and the direct structure of FIG. 6 can be combined so as to obtain a mixed structure. For a better understanding of the composition of such a structure, FIG. 7 illustrates a simple example in which only two signal mixtures are processed. The summing device 112 receives on the one hand the signal $E_1(t)$ and on the other hand the signal $E_2(t)$, multiplied by a coefficient $-b_{12}$ in the multiplication cell 711. Moreover, the summing device 212 receives on the one hand the signal $E_2(t)$ and on the other hand the output signal $\hat{X}1(t)$ multiplied by a coefficient $-b_{21}$ in the multiplication cell 713. The estimated identification signals $\hat{X}1(t)$ and $\hat{X}2(t)$ are supplied by the summing devices 112 and 212, respectively. A summing device can thus receive on the one hand one of the signal mixtures directly and on the other hand zero, one or several other signal mixtures $E(t)$, and zero, one or several estimated identification signals, the latter signals being weighted with a respective separation coefficient. The cases with zero other signal mixtures and with zero estimated identification signals are mutually exclusive. The adaptation of the coefficients $b_{ki}$ is performed, as before, in the adaptation means ADAPT 105.

Figure 8:
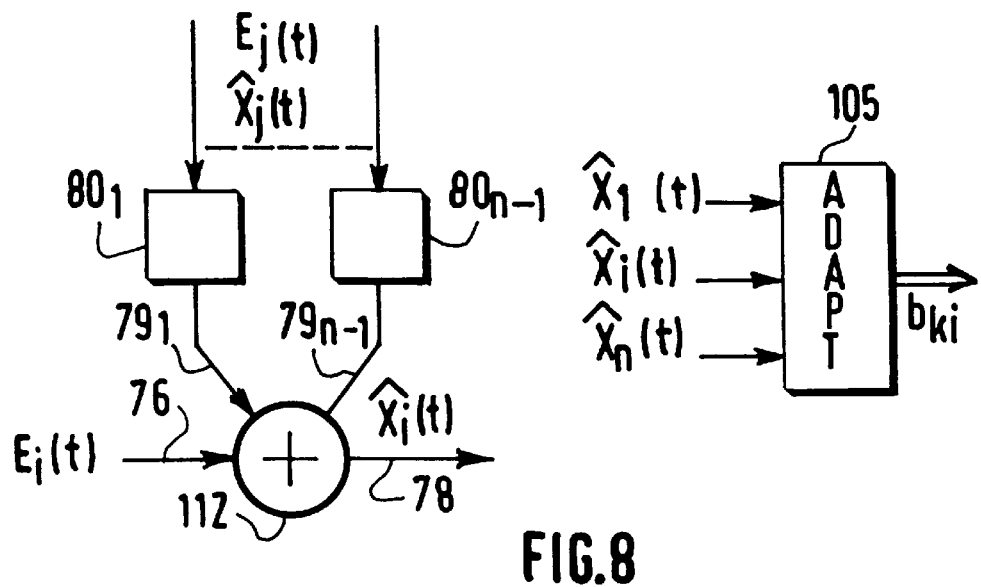
FIG. 8 shows a partial diagram generalizing the diagram of FIG. 7.

FIG. 8 shows a generalized structure for a single channel for determining an estimated identification signal. The summing device 112 receives, via an input 76, the signal mixture $Ei(t)$ whereto the estimated identification signal $\hat{X}i(t)$ delivered by the output 78 corresponds. The summing device 112 also receives other signal mixtures $Ej(t)$ and/or estimated identification signals $\hat{X}j(t)$ via other inputs $79_1$ to $79_{n-1}$ said other signals being weighted with separation coefficients in the cells $80_1$ to $80_{n-1}$. The adaptation of the coefficients $b_{ki}$ is performed, as before, in the adaptation means ADAPT 105.

FIGS. 5, 6, 7, 8 show with filtering cells formed by multiplication cells, each of which applies a single separation coefficient. This concerns the case where the source separation device serves to process instantaneous linear signal mixtures. In the general case where this is not so, the signals to be treated are convolutional signals. It is then necessary to replace a filtering cell for a single separation coefficient by a filtering cell with several weighting coefficients, which cells are known as adaptive filtering cells. For example, the filtering cell 211 (multiplication cell) of FIG. 5 must be replaced by the adaptive filtering cell shown in FIG. 9. This adaptive filtering cell includes an array of shift registers $90_1$ to $90_p$ whose outputs are connected to multiplication means $92_0$ to $92_p$ which serve to multiply the signal presented to their input by a respective weighting coefficient. The outputs of all multiplication means $92_0$ to $92_p$ are summed in a summing device 95 which outputs a filtered version $<I(t)>$ of the signal $I(t)$ applied to the input.

Figure 9:
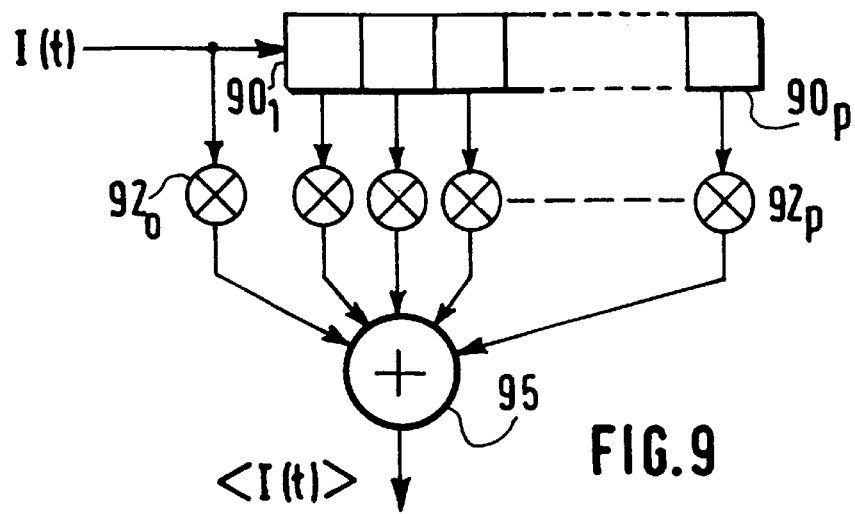
FIG. 9 shows a diagram of an adaptive filtering means.

It appears that a cell as shown in FIG. 5, i.e. a cell with a single separation coefficient, is a special version of the cell of FIG. 9 in which only one multiplication by the first coefficient applied by the first multiplication means $92_0$ is preserved.

We claim:

1. A base station coupled to at least one data carrier via wireless links in order to exchange data, the base station comprising:

transmitter means for interrogating the at least one data carrier;

receiver means for receiving an identification signal transmitted by the at least one data carrier in response to the interrogating by the transmitter means;

wherein the receiver means comprises, in order to establish a plurality of wireless links simultaneously between the base station and plural data carriers, (i) a source separation device for separating mixtures of individual identification signals received from ones of the data carriers simultaneously requesting connection to the base station so as to generate estimated signals corresponding to the individual identification signals received from the plural data carriers, and for outputting the estimated signals, and (ii) several demodulation units which are connected either to an output or to an input of the source separation device; and plural decoders for receiving the estimated signals from the source separation device, and for decoding the estimated signals in order to identify each of the respective data carriers.

2. A base station coupled to at least one data carrier via wireless links in order to exchange data, the base station comprising:

transmitter means for interrogating the at least one data carrier; and receiver means for receiving an identification signal transmitted by the at least one data carrier in response to the interrogating by the transmitter means;

wherein the receiver means comprises, in order to establish a plurality of wireless links simultaneously between the base station and plural data carriers, (i) a source separation device for processing mixtures of individual identification signals received from ones of the data carriers simultaneously requesting connection to the base station so as to generate estimated signals corresponding to the individual identification signals received from the plural data carriers, and for outputting the estimated signals, and (ii) several demodulation units which are connected either to an output or to an input of the source separation device; and wherein, for the simultaneous identification of n data carriers, the source separation device includes n recursively connected summing devices, each summing device comprising:

an input for receiving a signal mixture;

an output for delivering either an estimated identification signal of one of the data carriers or an estimation signal which is dependent on the identification signal; and n−1 inputs, each of which is connected to a respective output of one of n−1 other summing devices via n−1 filtering means applying at least one respective filtering coefficient.

3. A base station coupled to at least one data carrier via wireless links in order to exchange data, the base station comprising:

transmitter means for interrogating the at least one data carrier; and receiver means for receiving an identification signal transmitted by the at least one data carrier in response to the interrogating by the transmitter means, wherein the receiver means comprises, in order to establish a plurality of wireless links simultaneously between the base station and plural data carriers, (i) a source separation device for processing mixtures of individual identification signals received from ones of the data carriers simultaneously requesting connection to the base station so as to generate estimated signals corresponding to the individual identification signals received from the plural data carriers, and for outputting the estimated signals, and (ii) several demodulation units which are connected either to an output or to an input of the source separation device;

wherein, for the simultaneous identification of n data carriers, the source separation device comprises n summing devices which are not recursively connected, each sunning device comprising:

n inputs, each of which receives a respective one of n mixture signals via n filtering means applying at least one respective filtering coefficient; and an output for delivering either an estimated identification signal of one of the data carriers or an estimation signal which is dependent on the identification signal; and wherein said source separation device includes means for adapting filtering coefficients so as to enable the source separation device to supply estimated identification signals.

4. A base station coupled to at least one data carrier via wireless links in order to exchange data, the base station comprising:

transmitter means for interrogating the at least one data carrier; and receiver means for receiving an identification signal transmitted by the at least one data carrier in response to the interrogating by the transmitter means;

wherein the receiver means comprises, in order to establish a plurality of wireless links simultaneously between the base station and plural data carriers, (i) a source separation device for processing mixtures of individual identification signals received from ones of the data carriers simultaneously requesting connection to the base station so as to generate estimated signals corresponding to the individual identification signals received from the plural data carriers, and for outputting the estimated signals, and (ii) several demodulation units which are connected either to an output or to an input of the source separation device;

wherein, for the simultaneous identification of n data carriers, the source separation device comprises n summing devices, each summing device comprising:

an input for receiving a respective signal mixture;

an output for delivering either an estimated identification signal of one of the data carriers or an estimation signal which is dependent on the identification signal; and n−1 inputs which are connected partly to an output of a part of n−1 other summing devices and partly to one of the other signal mixtures via n−1 filtering means applying at least one respective filtering coefficient; and wherein said source separation device includes means for adapting filtering coefficients so as to enable said source separation device to supply estimated identification signals.

5. A method of identifying plural data carriers by exchanging data over wireless links, the method comprising the steps of:

interrogating, the plural data carriers;

receiving an individual identification signal from each of the plural data carriers in response to the interrogating performed in the interrogating step;

separating mixtures of the individual identification signals received from the plural data carriers so as to generate estimated signals corresponding to the individual identification signals received from the plural data carriers; and decoding the estimated signals received from the source separation device in order to identify each of the respective data carriers.

6. A method of identifying plural data carriers by exchanging data over wireless links, the method comprising the steps of:

interrogating the plural data carriers;

receiving an individual identification signal from each of the plural data carriers in response to the interrogating performed in the interrogating step;

processing mixtures of the individual identification signals received from the plural data carriers so as to generate estimated signals corresponding to the individual identification signals received from the plural data carriers; and outputting the estimated signals to identify each data carrier;

wherein the processing step is performed by a source separation device; and wherein, for the simultaneous identification of n data carriers, the source separation device includes n recursively connected summing devices, each summing device comprising:

an input for receiving a signal mixture;

an output for delivering either an estimated identification signal of one of the data carriers or an estimation signal which is dependent on the identification signal; and n−1 inputs, each of which is connected to a respective output of one of n−1 other summing devices via n−1 filtering means applying at least one respective filtering coefficient.

7. A method of identifying plural data carriers by exchanging data over wireless links, the method comprising the steps of:

interrogating the plural data carriers;

receiving an individual identification signal from each of the plural data carriers in response to the interrogating performed in the interrogating step:

processing mixtures of the individual identification signals received from the plural data carriers so as to generate estimated signals corresponding to the individual identification signals received from the plural data carriers; and outputting the estimated signals to identify each data carrier;

wherein the processing step is performed by a source separation device;

wherein, for the simultaneous identification of n data carriers, the source separation device comprises n summing devices which are not recursively connected, each summing device comprising:

n inputs, each of which receives a respective one of n mixture signals via n filtering means applying at least one respective filtering coefficient; and an output for delivering either an estimated identification signal of one of the data carriers or an estimation signal which is dependent on the identification signal; and wherein the source separation device includes means for adapting filtering coefficients so as to enable the source separation device to supply estimated identification signals.

8. A method of identifying plural data carriers by exchanging data over wireless links, the method comprising the steps of:

interrogating the plural data carriers;

receiving an individual identification signal from each of the plural data carriers in response to the interrogating performed in the interrogating step;

processing mixtures of the individual identification signals received from the plural data carriers so as to generate estimated signals corresponding to the individual identification signals received from the plural data carriers; and outputting the estimated signals to identify each data carrier;

wherein the processing step is performed by a source separation device;

wherein, for the simultaneous identification of n data carriers, the source separation device comprises n summing devices, each summing device comprising:

an input for receiving a respective signal mixture;

an output for delivering either an estimated identification signal of one of the data carriers or an estimation signal which is dependent on the identification signal; and n−1 inputs which are connected partly to an output of a part of n−1 other summing devices and partly to one of the other signal mixtures via n−1 filtering means applying at least one respective filtering coefficient; and wherein the source separation device includes means for adapting filtering coefficients so as to enable the source separation device to supply estimated identification signals.

* * * * *